United States Patent
Joshi et al.

(10) Patent No.: US 8,463,705 B2
(45) Date of Patent: Jun. 11, 2013

(54) SYSTEMS AND METHODS FOR TRANSACTIONS ON THE TELECOM WEB

(75) Inventors: Anupam Joshi, Bangalore (IN);
Srinivas G. Narayana, Bangalore (IN);
Aaditeshwar Seth, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 12/714,540

(22) Filed: Feb. 28, 2010

(65) Prior Publication Data

US 2011/0213706 A1    Sep. 1, 2011

(51) Int. Cl.
*G06Q 40/00*   (2012.01)

(52) U.S. Cl.
USPC ............................................. 705/44; 704/246

(58) Field of Classification Search
USPC ............................. 705/44; 746/258; 704/246
See application file for complete search history.

(56) References Cited

U.S. PATENT DOCUMENTS

| | | | |
|---|---|---|---|
| 6,397,198 B1 * | 5/2002 | Hoffman et al. ................ | 705/44 |
| 6,581,035 B1 | 6/2003 | Madan et al. | |
| 7,383,572 B2 | 6/2008 | Rolfe | |
| 7,457,782 B2 | 11/2008 | Nakajima | |
| 7,461,010 B2 | 12/2008 | Kwan | |
| 7,461,258 B2 * | 12/2008 | Rolfe ............................ | 713/176 |
| 7,536,304 B2 | 5/2009 | Di Mambro et al. | |
| 2006/0277043 A1 | 12/2006 | Tomes et al. | |
| 2007/0255620 A1 | 11/2007 | Tumminaro et al. | |
| 2007/0255653 A1 | 11/2007 | Tumminaro et al. | |
| 2008/0015859 A1 * | 1/2008 | Novack et al. ................ | 704/246 |

FOREIGN PATENT DOCUMENTS

JP    10198739    7/1996

OTHER PUBLICATIONS

McTear, Michael F., "Spoken Dialogue Technology: Enabling the Conversational User Interface", ACM Computing Surveys, vol. 34, No. 1, Mar. 2002, pp. 90-0169.
James, David, Hutter, Hans-Peter, Bimbot, and Bimbot, Frederic, "CAVE—Speaker Verification in Banking and Telecommunications", CAVE Project, European Union by Grant LE-1930, http://citeseerx.ist.psu.edu/viewdoc/summary?dol=10.1.1.33.3956.
Markowitz, Judith A., "Speaker Recognition", http://www.sciencedirect.com/science.

* cited by examiner

*Primary Examiner* — Samica L Norman
(74) *Attorney, Agent, or Firm* — Ference & Associates LLC (57) ABSTRACT

Embodiments of the invention broadly contemplate systems, methods, apparatuses and program products that leverage the mobile web, especially the spoken (telecom) web, to handle transactions. According to embodiments of the invention, in essence, a mobile device such as a phone is used as a terminal, remote authentication is employed, and a challenge response using a per transaction audio based code is used as a confirmation. Embodiments of the invention also provide further protection against repudiation, and greater trust in the transaction, by employing witnesses.

24 Claims, 5 Drawing Sheets

SYSTEMS AND METHODS FOR TRANSACTIONS ON THE TELECOM WEB

BACKGROUND

The subject matter described herein generally relates to systems and methods for conducting transactions (for example, monetary transactions, banking and the like) on the telecommunications web ("spoken web"), particularly in under-served areas without access to Internet connections and/or sophisticated banking tools, such as ATM machines, Internet account management systems, et cetera.

Conventional schemes to take banking to under-served (often remote or rural) areas are insufficient because physical bank branches cannot go to these areas in many cases. Moreover, ready Internet access is either not available in these areas or the potential customers cannot make use of such for accessing online banking tools because the customers do not have high end devices (such as laptop PCs or smartphones). Reports by government agencies in many areas, such as in rural areas of India, indicate low penetration of banking and a lack of financial inclusion for such areas.

Current efforts to fix this either involve setting up a wirelessly connected ATM-like infrastructure (which is expensive and hard to maintain), or a banking correspondent model using people who move money from a branch to remote areas in person. These solutions, however, suffer from a high overhead because of the high cost and the difficulty in travel (and the dangers involved), respectively. Thus, the known approaches essentially demand a person in under-served areas carry cash and/or some device (ATM) to perform bank or credit related transactions. This is often cited as a reason for high interest rates in micro-credit schemes and for the lack of the spread of banking to more remote areas.

BRIEF SUMMARY

Embodiments of the invention broadly contemplate systems, methods, apparatuses and program products that leverage the telecommunication infrastructure (especially mobile telephony) and the web, such as the spoken (telecom) web, to handle money transactions without cash. According to embodiments of the invention, in essence, a mobile device such as a phone is used as a terminal, remote biometrics are used for authentication, and an audio token (for example, a sound or a spoken pass-phrase) or other dynamically generated and sharable identifier, such as a keypad input is used as a confirmation. Embodiments of the invention also provide further protection against repudiation, and greater trust in the transaction, by employing witnesses.

In summary, one aspect of the invention provides an apparatus comprising: one or more processors; and a computer readable storage medium having computer readable program code embodied therewith and executable by the one or more processors, the computer readable program code comprising: computer readable program code configured to authenticate one or more users over a voice channel; computer readable program code configured to process one or more transaction requests of the one or more users communicated over the voice channel; and computer readable program code configured to implement a policy prior to completion of processing of the one or more transaction requests, wherein the policy comprises determining if one or more witnesses are required to process the one or more transaction requests.

Another aspect of the invention provides a method comprising: authenticating one or more users over a voice channel; processing one or more transaction requests of the one or more users communicated over the voice channel; and implementing a policy prior to completion of processing of the one or more transaction requests, wherein the policy comprises determining if one or more witnesses are required to process the one or more transaction requests.

A further aspect of the invention provides a computer program product comprising: a computer readable storage medium having computer readable program code embodied therewith, the computer readable program code comprising: computer readable program code configured to authenticate one or more users over a voice channel; computer readable program code configured to process one or more transaction requests of the one or more users communicated over the voice channel; and computer readable program code configured to implement a policy prior to completion of processing of the one or more transaction requests, wherein the policy comprises determining if one or more witnesses are required to process the one or more transaction requests.

A still further aspect of the invention provides a computer program product comprising: a computer readable storage medium having computer readable program code embodied therewith, the computer readable program code comprising: computer readable program code configured to authenticate a payer over a voice channel; computer readable program code configured to process one or more transaction requests of the payer communicated over the voice channel; computer readable program code configured to authenticate one or more payees prior to completion of processing of the one or more transaction requests via issuing a one time audio token to the payer, and determining if the one or more payees provide the one time audio token; and computer readable program code configured to implement a policy prior to completion of processing of the one or more transaction requests, wherein the policy comprises determining if one or more witnesses are required to process the one or more transaction requests.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

What is described is systems and methods that provide reliable banking, particularly for small transaction values (transactions generally referred to as micro-credit, micro-banking, micro-financing and the like), in under-served areas. These areas include but are not necessarily limited to rural areas lacking local bank branches (physical bank locations), physical ATM machines, and areas having low Internet (and related device) penetration. In such areas, current solutions, such as having a banking agent travel to the area periodically to assist in completing transactions, is less than satisfactory. This solution involves unnecessary expenses such as requiring travel and poses many risks, for example travelling with large sums of cash. Convenient solutions, such as Internet banking and providing local bank branches, are not yet a reality in many areas. Thus, many potential customers in such under-served areas are currently left without a convenient banking solution. However, many of these areas do have telephone service and users in these areas can connect to the telecommunications web (spoken (telecom) web).

Accordingly, embodiments of the invention provide methods and supporting systems and devices allowing simple, verbal-based, cash-less transactions to be conducted over the spoken (telecom) web. These cash-less transactions provide safe and convenient ways to conduct business transactions without necessitating physical cash transfer. Moreover, all that is required is a simple device, such as a standard telephone or low end mobile phone (a device having voice channel communication capability).

The following description provides non-limiting and exemplary cash-less transaction schemes consistent with claimed embodiments of the invention. In the following descriptions, "client" refers to a bank account holder whose personal information is stored by the bank for purposes of authentication and record keeping. A "payer" is a client that transfers cash from his or her account to another user's or users' account(s). A "payee" is a client that receives the transferred cash in to his or her account.

To be a client, a person establishes an account with a bank/financial institution. The bank collects and stores certain client information, such as the client's (cell) phone number (from which the client will call in to the bank voice application to conduct business), biometric information (for example conversational biometric information as gathered and utilized by an appropriate voice analysis system), and a biographic profile (for example, name, address, parent's name(s), spouse's name, et cetera). Moreover, the bank issues a unique identifier (such as a pin number) to the client and/or per transaction.

As an authentication method, embodiments of the invention utilize, for example, a multi-factor authentication mechanism. Accordingly, a bank according to an embodiment of the invention institutes an authentication policy that mandates that a certain minimum amount of factors be authenticated for various types of transactions, prior to authorizing and processing the transactions. The factors can be selected from any of a wide variety of possible authentication factors, including but not limited to the client's phone number, the client's voice (or other biometric information), the client's biographic details, the client's pin number, et cetera.

According to embodiments of the invention, a client is associated with his or her bank account in order to conduct transactions. Account association is conducted by any of a variety of association methods, including for example DTMF bank account input, caller identification (caller ID) to bank account mapping, voice fingerprint to bank account number mapping and the like. In one embodiment, the payee is associated with the transaction via an association method, such as requiring that the payee bank account number be made explicit (DTMF input can be required), or the payee's phone number could be mapped to his or her account. Thus, the bank or financial institution involved can choose the most appropriate policy.

In one embodiment, the bank generates a per-transaction unique identifier (for example, an audio token such as a spoken phrase) to verify mutual agreement to complete a cash transfer between a payer and a payee. As will be readily understood by those having ordinary skill in the art, several implementation schemes are possible (modified appropriately to suit particular financial institution policy), and the following are simply non-limiting and exemplary cash-less transaction schemes consistent with the claimed embodiments of the invention.

The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
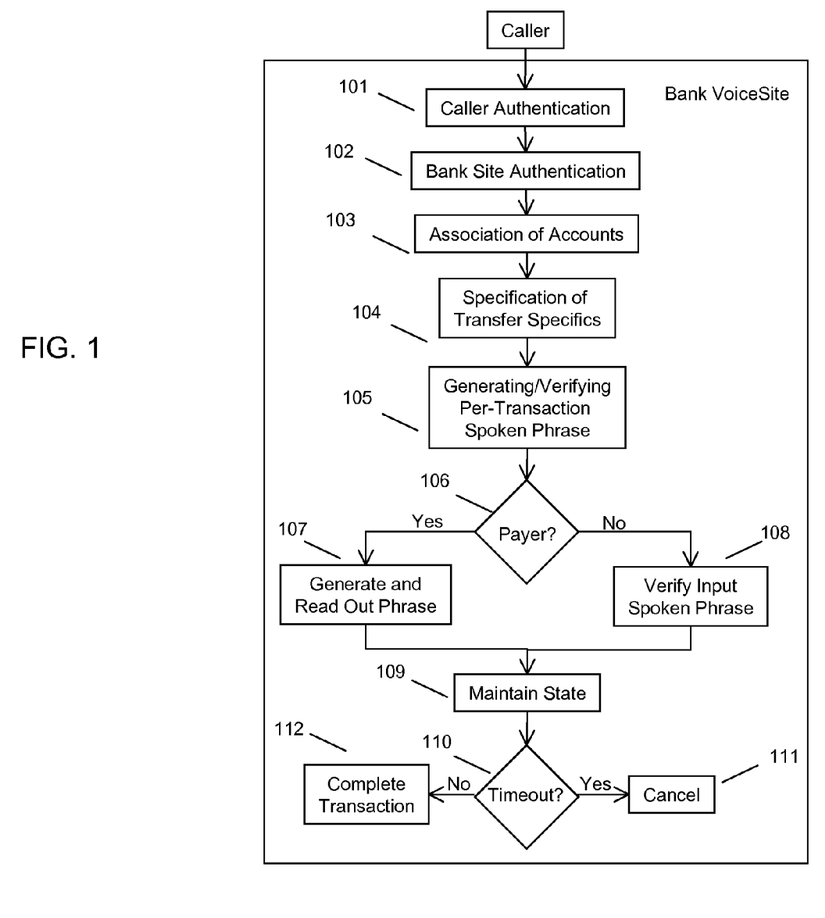
FIG. 1 illustrates an exemplary flow of transaction processing according to an embodiment.

Referring to FIG. 1, exemplary basic cash-less transaction steps are illustrated according to an embodiment of the invention. As shown, a caller initiates a cash-less transaction by calling into a financial institution voice application ("VoiceSite" on the telecom web). The caller is first authenticated at 101. Thereafter, a bank site authentication 102 is conducted, perhaps using HSTPS or other suitable protocol. At 103 the caller is associated with account(s), as described herein. The financial institution's voice application will then gather the specifics of the particular cash-less transaction at 104, such as the payee information, the amount to be transferred, etc. Next, a per-transaction spoken phrase is either generated or verified at 105, which depends on whether the caller is the payer or payee. If it is determined at 106 that the caller is the payer, a read out phrase is generated and delivered to the payer. If, on the other hand, the caller is determined to be the payee at 106, the spoken phrase can be required as input from the payee, which can be verified at 108. The payer and payee can exchange this phrase outside of the system, for example. Once the per-transaction phrase generation/verification is completed, the system will maintain a state (store the transaction information) at 109, because the transaction can be asynchronous (payer and payee calling in at different times to complete the transaction). A suitable timeout is set and begins a count down at 110 once the state is maintained. In one embodiment, if the transaction times out, for example because the second party fails to call in within a predetermined time period, the transaction is cancelled at 111. Otherwise, the transaction is completed and the specified funds transferred at 112.

Figure 2:
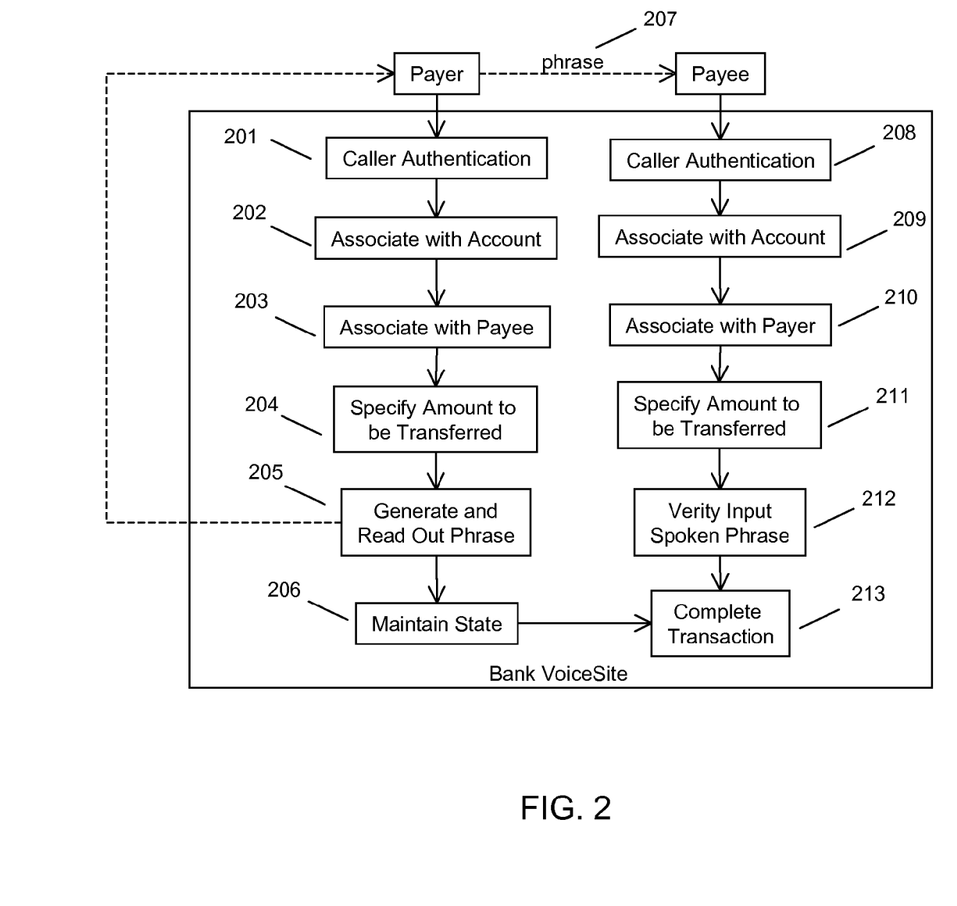
FIG. 2 illustrates an exemplary flow of transaction processing according to an embodiment.

Referring to FIG. 2, an exemplary cash-less transaction flow is illustrated. A payer calls in to the bank voice application on the telecom web. The payer is authenticated 201 by completing an authentication scheme, as described herein. The payer is associated with an account at 202 and associates the intended payee with the transaction at 203, for example by entering the payee's phone number. At 204, the payer enters transaction specifics, such as the amount to be transferred. The voice application then generates a phrase that is read out at 205 ("phrase" is used as an example, it could be any sound or other like identifier that can be reentered by the payee, as described further herein). The system maintains the information in a stable state at 206 until subsequent transaction steps are complete (or timeout, as described herein).

In one embodiment, the payer transmits the phrase to the payee at 207. The payee then calls in to the voice application and is authenticated at 208. Like the payer, the payee can associate himself or herself with the appropriate account at 209, and associate with the payer's account at 210, for example by entering a payer identifier such as the payer's phone number. At 211, the payee is asked to enter the amount of the transfer at 211 and verify the phrase at 212. Additional verification steps may be implemented, for example biometric identification, et cetera, as for example per bank policy. If the payer completes the necessary steps, the transaction is moved from the stable state maintained and placed in to permanent storage to complete the transaction at 213.

Embodiments of the invention may, for example, relax or constrain aspects of the cash-less transaction flow illustrated above. For example, the constraint of the user having only one phone can be relaxed to accept a set of phone numbers for the account, or, the payer and/or payee can be required to input more or less information in order to complete authentication, association and/or verification steps.

Embodiments of the invention are further configured to augment electronic derived trust (such as derived through the authentication, association and/or verification steps outlined above) with social trust via requiring one or more witnesses. Witnessed transactions are considerably more reliable and safer than standard transactions in rural or remote settings where the communities are close knit and people value maintaining good relations within the community. Thus, embodiments of the invention can be configured to require a witness to confirm a transaction is correct/authentic before the transaction is completed. The addition of one or more witnesses can augment or supplant certain steps. This can prove useful in a wide variety of contexts, such as when biometric information is unavailable. In many contexts, particularly in currently under-served areas such as rural communities, it should not prove difficult for users to obtain witnesses for transactions.

Figure 3:
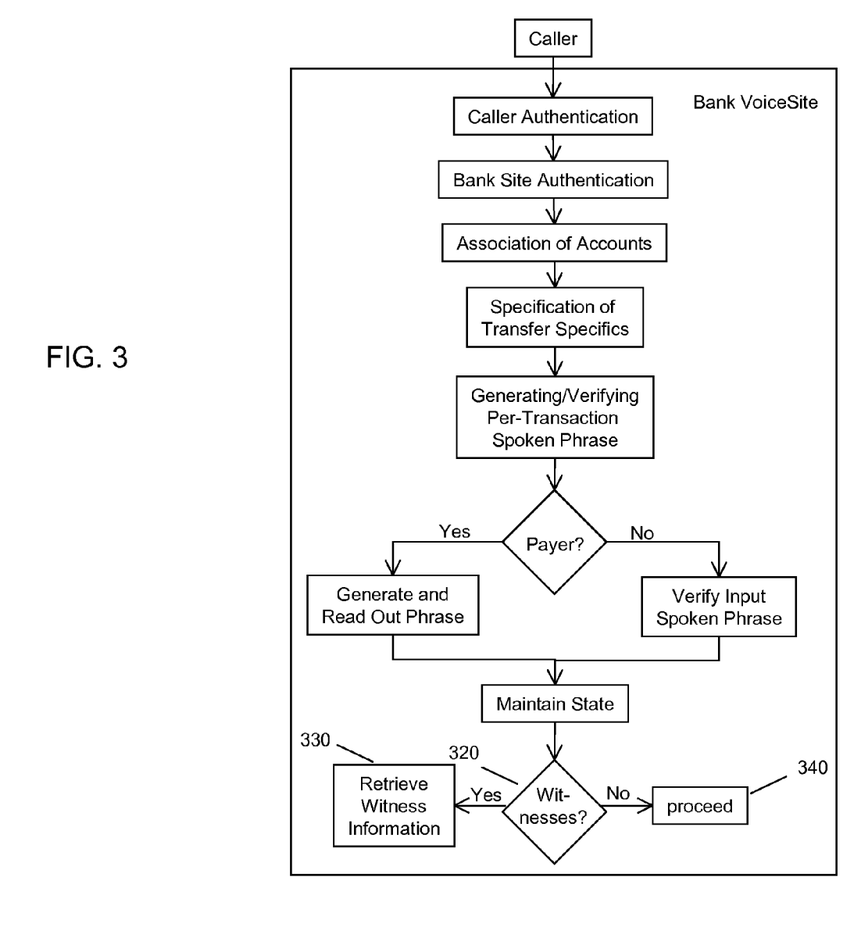
FIG. 3 illustrates an exemplary flow of transaction processing according to an embodiment.

FIG. 3 illustrates a basic model for a witnessed cash-less transaction according to an embodiment of the invention. As shown, the requirement for witness verification during the transaction can be implemented after the transacting parties have entered their information. However, this is only by way of example, and the requirement for one or more witnesses can be implemented at various stages of the transaction. Moreover, the financial institution can dictate by policy which transactions must be witnessed in order to proceed. Referring to FIG. 3, the call (payer or payee) calls in, is authenticated, the bank site is authenticated to the caller, the accounts are associated, the transactions specifics are entered, the spoken challenge (for example, a phrase) is generated/verified, and the state is maintained by the system. If the transaction is required to be a witnessed transaction (for example, per bank policy), this is determined at 320. If one or more witnesses are required, the witness information is retrieved at 330 by the system. In one embodiment, the system maintains the state until the witness information becomes available, should the witness not have entered his or her information yet. If one or more witnesses are not required, the system proceeds as above.

The witness information retrieved at 330 can be any of a wide variety and can be chosen as appropriate for the context. According to an embodiment, the witness is chosen by the payer as a person the payer trusts. This can be only one witness or a group of witnesses. Moreover, if a group of witnesses is required, the bank's policy can be customized to require a unanimous witness authorization or simply a majority of witnesses to approve the transaction. In one embodiment, the system maintains information about the witnesses such that when a witness is chosen, biographical information regarding the witness is known (for example, the witness is known to be trustworthy or untrustworthy, et cetera). Any appropriate witnessing scheme may be employed, such as having one or more witnesses for each side of the transaction (that is, one or more witnesses for both the payer and payee). In one embodiment, mutually trusted (agreed upon) witnesses may reduce the total number of witnesses required for a given transaction. Thus, a bank policy may dictate a minimum number of mutually agreed upon witnesses.

As with payer/payee verification, a witness authorizes a transaction by speaking out a phrase (in to a phone over a voice channel) in to the bank voice application, and the witness is authenticated using predetermined biometrics (for example, phrase identification, voice analysis and the like). As it is preferable that witnesses must authenticate themselves to the system, the witnesses are preferably bank customers as well (that is, have voice accounts with the banking system voice application). In one embodiment, witnesses are randomly chosen bank customers. In another embodiment, witnesses are gathered from a predetermined list (as by requiring each user to identify one or more potential witnesses for their transactions during enrollment, as by inputting a "friends" list). In some embodiments, a true peer-to-peer system is utilized, such that the witnesses need not be bank customers at all, and the transactions could be witnessed by having the witness(es) record voice messages for witnessing purposes. According to this scenario, trustworthy individuals are selected as witnesses (for example, respected local business people), and disputed transactions are confirmed at a later date as a post-processing step.

As with the payer/payee calls, embodiments of the invention allow for synchronous or asynchronous witnessing. That is, the witness may be a party to the same telephone call (synchronous) or may call in at an earlier/later time to witness the transaction (asynchronous).

Regarding the bank's internal (maintained) state, this can comprise a wide variety of information regarding each transaction needed for appropriate transaction processing. For example, a unique transaction ID, tagging for witnessing, payer phone number, payee phone number, payer bank account number, payee bank account number, list of witnesses (on each side), cash amount, and the one time audio token (phrase) used may all be maintained by the system in order to process the transaction.

Figure 4:
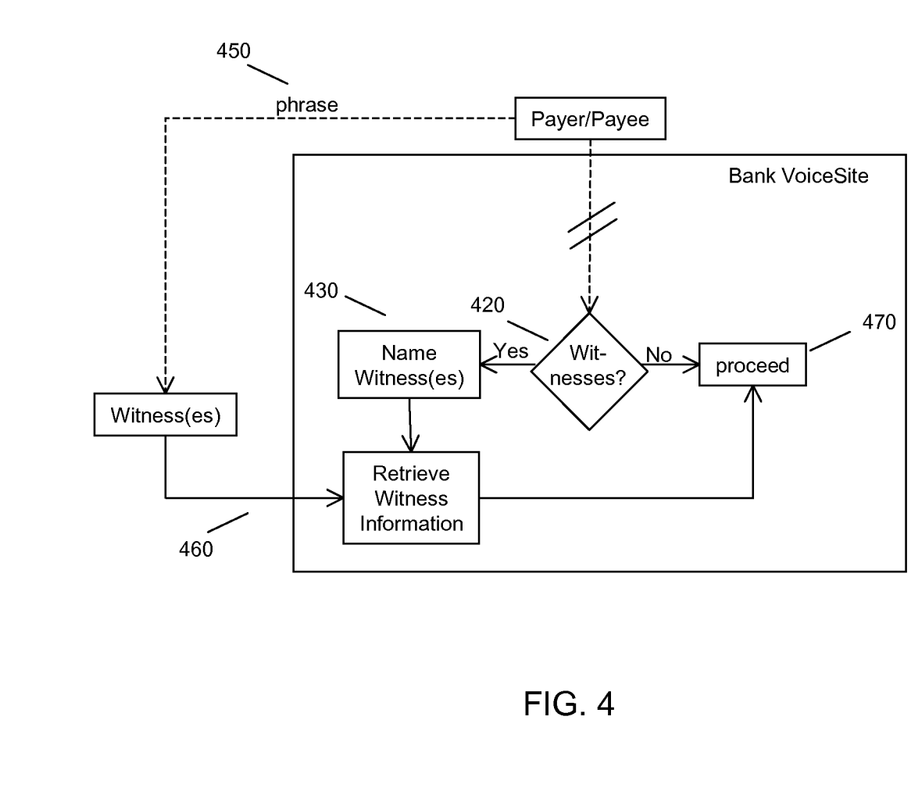
FIG. 4 illustrates and exemplary flow of transaction processing according to an embodiment.

Referring to FIG. 4, as a non-limiting example, the payer or payee proceeds through the bank's voice application site as described above, and, if it is determined at 420 that the transaction is tagged for witnessing, the payer or payee names the witness(es) at 430 (either verbally, through keypad input, et cetera). The payer or payee notifies the witnesses at 450 of the authentication/verification information (for example, the phrase related to the transaction). The witness(es) then enter the appropriate information into the system at 460, which is then retrieved by the system and matched to the transaction tagged for witnessing. The process then proceeds to completion at 470 (for example, transfer of funds).

As described herein, callers, including the witnesses can be required to verify themselves. This can take the form of verifying a simple phrase, for example and utilizing a transaction ID issued by the system. Witnesses can be added to a state table of the bank's voice application as and when they authorize the transaction. The bank commits the transaction and updates the account balances as necessary, for example, when the witness information has been retrieved, only if the minimum number of witnesses for the given transaction are accounted for, the payer and receiver (payee) had their majority of witnesses authorize the transaction, and/or there are a minimum number of mutually trusted witnesses as specified by the applicable bank policy.

It will be readily understood that embodiments of the invention utilize one or more voice applications running on one or more computing devices within the spoken (telecom) web. These voice applications are configured to interface with both standard (for example, voice only) phones and complex mobile phones (smart phones) over voice channel links. The spoken (telecom) web is described in detail elsewhere and thus will not be described in detail herein. However, it should be noted that any of a wide variety of computing systems might be utilized to implement voice applications for handling the types of cash-less transactions described herein. In this regard, a non-limiting and exemplary computing device is described below.

Figure 5:
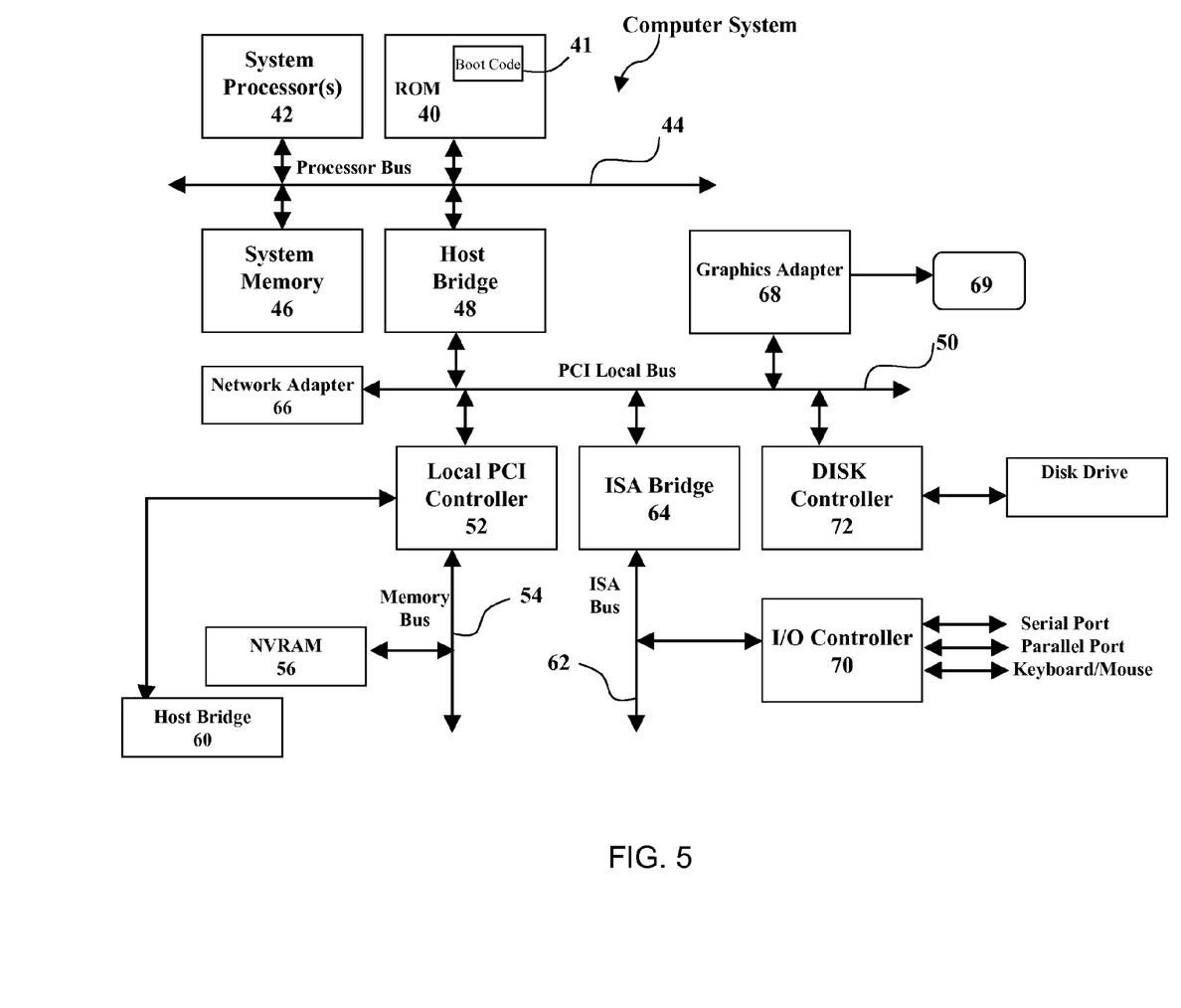
FIG. 5 illustrates an exemplary computer system according to an embodiment.

Referring now to FIG. 5, there is depicted a block diagram of an illustrative embodiment of a computer system. The illustrative embodiment depicted in FIG. 5 may be an electronic device such as a laptop or desktop personal computer, a server or the like. As is apparent from the description, however, aspects of the invention may be implemented in any appropriately configured device.

As shown in FIG. 5, computer system includes at least one system processor 42, which is coupled to a Read-Only Memory (ROM) 40 and a system memory 46 by a processor bus 44. System processor 42 is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system further includes Industry Standard Architecture (ISA) bus 62, which is coupled to PCI local bus 50 by ISA bridge 64. Coupled to ISA bus 62 is an input/output (I/O) controller 70, which controls communication between computer system and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

It should be noted as well that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising.;
one or more processors; and
a computer readable storage medium having computer madable program code embodied therewith and executable by the one or more processors. the computer readable program code comprising:
computer readable program code configured to authenticate one or more users over a voice channel;
computer readable program code configured to process one or more transaction requests of the one or more users communicated over the voice channel; and
computer readable program code configured to inplement a policy prior to completion of processing one or more transaction request, wherein the policy is based on a determination that one or more witnesses are required to process the one or more transaction requests.

2. The apparatus according to claim 1, further comprising computer readable program code configured to responsive to determining one or more witnesses are required to process the one or more transaction requests, store a transaction state until one of a time out is reached and witness information required by policy is received.

3. The apparatus according to claim 2, further comprising computer readable program code configured to, responsive to receipt of witness information, transfer funds of the one or more users to one or more other user accounts.

4. The apparatus according to claim 1, wherein the computer readable program code configured to authenticate one or more users over a voice channel is further configured to authenticate using one or more stored biometrics of the one or more users.

5. The apparatus according to ciaim 1, further comprising computer readable program code configured to store one or more transaction specifics input by the one or more users via the voice channel.

6. The apparatus according to claim 1, further comprising computer readable program code configured to associate the one or more users with one or more user accounts.

7. The apparatus according to claim 1, further comprising computer readable program code configured to associate the one or more transaction requests with one or more other user accounts.

8. The apparatus according to claim 1, wherein the policy further comprises determining if one or more witnesses mutually trusted by the one or more users and one or more other users arc required to process the One or more transaction requests.

9. The apparatus accord g to claim 1, wherein the policy further Comprises, responsive to determining one or more witnesses are required to process the one or more transaction requests, requiring the one or more witnesses to authenticate and approve the one or more transaction requests.

10. The apparatus according to claim 9, wherein requiring the one or more witnesses to authenticate comprises requiring the witnesses to provide a one time audio token over a voice channel, the one time audio token hs vinu been previously issued to the one more users.

11. The apparatus according to claim 10. wherein the one ime audio token comprises a spoken pharse.

12. The apparatus according to claim 1, wherein the computer readable program code configured to authenticate one or more users over a voice channel is further configured to authenticate a payer and a payee associated with the one or more transaction requests prior to completion of processing of the one or more transaction requests, wherein to authenticate a payer and a payee comprises issuing a one time audio token to the payer, and determining if the payee provides the one time audio token.

13. A method comprising:
utilizing a processor to execute computer code configured to perform the steps of:
authenticating one or more users over a voice channel;
processing one or more transaction requests of the one or more users communicated over the voice channel; and
implementing a policy prior to completion of processing of the one or more transaction requests, wherein the policy is based on a determination that one or more witnesses are required to process the one or more transaction requests.

14. The method according to claim 13, further comprising, responsive to determining one or more witnesses are required to process the one or more transaction requests, storing a transaction state until one of a time out is reached and witness information required by policy is received.

15. The method according to claim 14, further comprising, responsive to receipt of witness information, transferring funds of the one or more users to one or more other user accounts.

16. The method according to claim 13, wherein authenticating one or more users over a voice channel further comprises authenticating the one or more users using one or more stored biometrics of the one or more users.

17. The method according to claim 13, further comprising storing one or more transaction specifics input by the one or more users via the voice channel.

18. The method according to claim 13, further comprising associating the one or more users with one or more user accounts.

19. The method according to claim 13, wherein the policy further comprises determining if one or more witnesses mutually trusted by the one or more users and one or more other users are required to process the one or more transaction requests.

20. The method according to claim 13, wherein the policy further comprises, responsive to determining one or more witnesses are required to process the one or more transaction requests. requiring the one or more witnesses to authenticate and approve the one or more transaction requests.

21. The method according to claim 20, wherein requiring the one or more witnesses to authenticate comprises requiring the witnesses to provide a one time audio token over a voice channel, the one time audio token having been previously issued to the one more users.

22. The method ac.cording to claim 21, wherein the one time audio token comprises a spoken pnrase.

23. The method according to claim 13, wherein authenticating a user over a voice channel further comprises authenticating a payer and a payee associated with the one or more transaction requests prior to completion of processing of the one or more transaction requests, wherein to authenticate a payer and a payee comprises issuing a one time audio token to the payer, and. determining if the payee provides the one time audio token.

24. A computer program product comprising:
a non-transitory computer readable storage medium having computer readable program code embodied therewith. the computer readable program code comprising:
computer readable program code configured to authenticate one or more users over a voice channel;
computer readable program code configured to process one or more transaction requests of the one or more users communicated over the voice channel; and
computer readable program code configured to implement a policy prior to completion of processing of the one or more transaction requests, wherein the policy is based on a determination that one or more witnesses are required to process the one or more transaction requests.

* * * * *